Patented Apr. 9, 1929.

1,708,712

UNITED STATES PATENT OFFICE.

ERNEST H. VOLWILER, OF HIGHLAND PARK, AND DONALEE L. TABERN, OF LAKE BLUFF, ILLINOIS, ASSIGNORS TO ABBOTT LABORATORIES, OF NORTH CHICAGO, ILLINOIS, A CORPORATION OF ILLINOIS.

ANTISEPTIC ANÆSTHETIC SALTS.

No Drawing. Application filed July 25, 1927. Serial No. 208,408.

As is well known, many substances possess pronounced local anæsthetic properties, but very few of them are capable of exerting effective antiseptic action. Such antiseptic action is particularly desirable, due to the fact that local anæsthetics are frequently employed for topical application to areas which are abraded or otherwise injured so that infection is likely to result if an efficient antiseptic is not available. The uses of mixtures of many local anæsthetics and antiseptics is often undesirable, because of incompatibilities between the two types of compounds, and because of the inconvenience of application of several medicaments in succession.

In the preparation of compounds possessing both antiseptic and anæsthetic power, difficulties ordinarily arise, due to the fact that chemical combination between the components will not take place. For example, an anæsthetic such as salicyl alcohol cannot be made to combine with an antiseptic like phenol; and even when chemical combinations of the desired nature are accomplished, the resulting products have frequently lost one or both of the requisite therapeutic properties.

We have found that it is possible to make salts by combining n-butyl-p-aminobenzoate with halogenated aromatic sulfonic acids containing a phenolic hydroxyl group; the resultant products are effective as local anæsthetics for topical application, and exert pronounced antiseptic action as well. The desired reaction may be brought about by dissolving the anæsthetic and the antiseptic separately in suitable solvents, mixing the solutions to produce the reaction, and filtering off the compound which separates from solution as a result of the reaction. Various solvents may be employed, and we do not limit ourselves to the particular method outlined here. The compounds so produced are represented by the formula

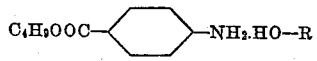

in which R represents a halogen substituted aromatic sulfonic acid.

*Example I. Para - amino - n - butyl benzoate salt of 2,6-di-iodophenol-4-sulfonic acid.*

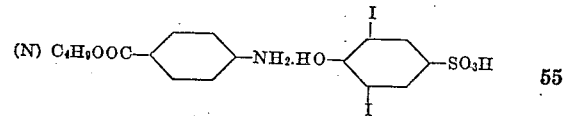

50 grams of the sodium salt of 2,6-di-iodophenol-4-sulfonic acid is dissolved in a small quantity of boiling water. A solution in boiling water is also made of 25 grams of the sulfate of para-amino-n-butyl benzoate, with the addition of sufficient sulfuric acid to give a clear solution. The two boiling solutions are mixed with good stirring; the solution may be inoculated to hasten crystallization. Almost immediately there results a pasty mass of hair-like crystals of the salt which is formed. The crystals are filtered and washed with water. After recrystallization from dilute alcohol, this product melts, with decomposition, at 200° C. It is only slightly soluble in water, has a light yellowish-gray color, and exerts strong anæsthetic and antiseptic action.

*Example II. Para-amino - n - butyl benzoate salt of 2,6-dibromophenol-4-sulfonic acid.*

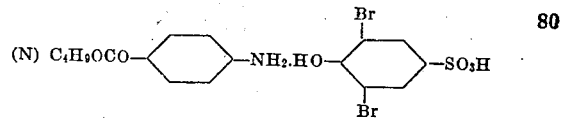

The reaction may be carried out as described in Example I, 25 grams of the sulfate of para-amino-n-butyl-benzoate in 200 cc. hot water, and 37 grams of the potassium salt of 2,6-dibromophenol-4-sulfonic acid in 300 cc. hot water being employed. Crystallization takes place quickly, particularly when inoculated. The solid is filtered and washed with water or with small amounts of alcohol and ether. The product is a white solid, melting at 216–218° C., sparingly soluble in water, and having a strong anæsthetic and antiseptic action.

*Example III. Para-amino-n-butyl benzoate salt of 7-iodo-8-hydroxy-quinoline-5-sulfonic acid.*

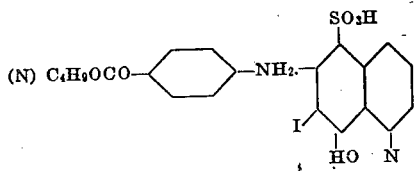

7 grams of the sulfonic acid is dissolved in hot ammonium hydroxide solution and added to a hot aqueous solution of 5 grams of the sulfate of para-amino-n-butyl benzoate, the latter containing a little excess sulfuric acid. An oil separates, and on cooling solidifies to a mass of orange crystals. Upon recrystallization from 50% alcohol, the product is obtained as orange crystals which melt at 235–240° C. The product is sparingly soluble in water, and is a powerful anæsthetic with strong antiseptic properties.

The scope of the invention should be determined by reference to the appended claims, said claims to be construed as broadly as possible consistent with the state of the art.

We claim as our invention:

1. As a new medicament exerting both anæsthetic and antiseptic action, a compound of n-butyl-p-amino benzoate and a halogenated aromatic sulfonic acid containing a phenolic hydroxyl group.

2. As a new article of manufacture, an anæsthetic-antiseptic compound of n-butyl-p-amino benzoate and a halogenated phenol sulfonic acid.

3. As a new article of manufacture, an anæsthetic-antiseptic compound of n-butyl-p-amino benzoate and an iodinated phenol sulfonic acid.

4. As a new article of manufacture, an anæsthetic-antiseptic compound of n-butyl-p-amino benzoate and a di-iodophenol sulfonic acid.

5. As a new anæsthetic-antiseptic compound, the salt of n-butyl-p-amino benzoate and 2,6-di-iodophenol-4-sulfonic acid, and having the structure

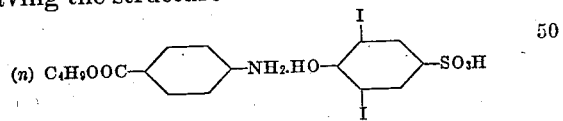

which is a white solid, melting at 200° C. with decomposition, almost insoluble in water, but soluble in certain vegetable oils, as well as in other organic solvents.

July 20, 1927.

ERNEST H. VOLWILER.
DONALEE L. TABERN.